No. 766,287.

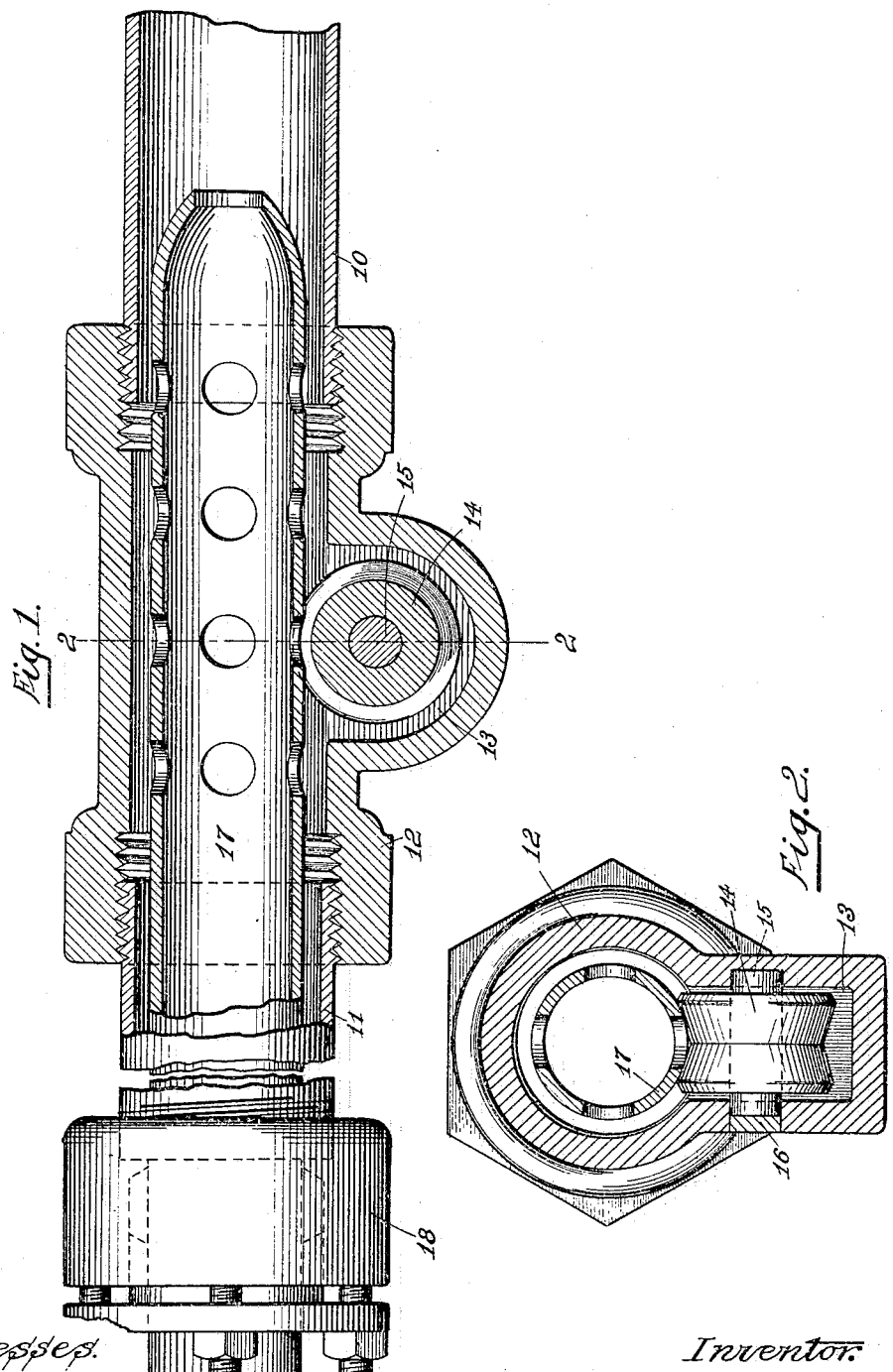

Patented August 2, 1904.

UNITED STATES PATENT OFFICE.

LOREN L. PRESCOTT, OF MARINETTE, WISCONSIN.

PRESSURE-TRANSMITTER.

SPECIFICATION forming part of Letters Patent No. 766,287, dated August 2, 1904.

Application filed May 7, 1904. Serial No. 206,859. (No model.)

*To all whom it may concern:*

Be it known that I, LOREN L. PRESCOTT, a citizen of the United States, and a resident of Marinette, county of Marinette, and State of Wisconsin, have invented certain new and useful Improvements in Pressure-Transmitters, of which the following is a specification, and which are illustrated in the accompanying drawings, forming a part thereof.

This invention relates to fluid-pressure-transmitting devices of the telescopic type and adapted for use in conveying fluid-pressure from a stationary source of supply to a movable translating device.

The present invention is an improvement upon the transmitter for which Letters Patent No. 658,220 were granted to me September 18, 1900; and the object of the invention is to provide more efficiently for preventing wear upon the movable or telescoping member of the transmitter.

It consists in a transmitter having located within its stationary member one or more antifriction-rollers, upon which the entering member may ride, and more specifically of couplings for uniting sections of the stationary member and provided with pockets within which such antifriction-rollers may be housed.

The invention is illustrated in the accompanying drawings, in which—

Figure 1 is a detail longitudinal view, partly in elevation and partly in section, of the improved transmitter; and Fig. 2 is a transverse section on the line 2 2 of Fig. 1.

The device comprises two pipes, the one adapted to be stationary and to lead from the source of pressure and the other to be attached to the moving translator—such, for example, as a motor located on a sawmill-carriage. The larger or stationary member is preferably composed of a plurality of sections, as 10 and 11, united by a coupling 12, into which the sections of the pipe are screwed. The coupling 12 is provided with an internal pocket 13, projecting downwardly, within which is housed an antifriction-roller 14, carried by a shaft 15, set in suitable apertures in the side walls of the pocket.

For convenience in assembling, the apertures for carrying the shaft 15 may be formed by drilling entirely through one of the side walls of the pocket and into the inner face of the opposite wall and after the shaft has been inserted filling the outer end of the initial aperture by a plug 16. The roller 14 is of course dropped into the pocket 13 before the pin is inserted, so that the latter may pass through its eye. The diameter of the roller 15 is such that its periphery, which is preferably annularly grooved, extends into the chamber of the coupling 12 and carries the telescoping member 17 of the transmitter, which enters the stationary member through a stuffing-box 18, applied to the end thereof.

The member 17 is turned up to a smooth surface and slides through the stuffing-box, and in the practice heretofore prevailing its inner end has either dragged on the bottom of the stationary member or, as in the case of the structure shown by my earlier patent, has been carried by the couplings uniting the several sections of this member of the transmitter.

The present invention provides for the elimination of practically all of the friction from the moving member of the transmitter except at the stuffing-box, and thus prevents wear.

I claim as my invention—

1. In combination, a pair of telescoping pipes, the outer pipe having a stuffing-box surrounding the inner pipe, and a tubular block intermediate of its ends provided in its bore with an antifriction-roller.

2. In combination, a pair of telescoping pipes, the outer pipe being sectional, and a coupling uniting adjacent sections, and an antifriction-roller located within the bore of the coupling for carrying the inner pipe.

3. In combination, a sectional pipe, a coupling uniting adjacent sections and having an internal pocket, a roller journaled within the pocket, its periphery extending into the bore of the coupling, and a pipe telescopically entering the sectional pipe.

LOREN L. PRESCOTT.

Witnesses:
JAMES A. HAMILTON,
RAY H. SMEAD.